United States Patent
Tsujimoto

(10) Patent No.: US 7,984,215 B2
(45) Date of Patent: Jul. 19, 2011

(54) SEMICONDUCTOR DEVICE

(75) Inventor: Yoshitaka Tsujimoto, Tama (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 0 days.

(21) Appl. No.: 12/262,165

(22) Filed: Oct. 30, 2008

(65) Prior Publication Data
US 2009/0119430 A1    May 7, 2009

(30) Foreign Application Priority Data
Nov. 1, 2007    (JP) ................................. 2007-285051

(51) Int. Cl.
*G06F 13/00*    (2006.01)
*G06F 13/36*    (2006.01)
*H04L 12/50*    (2006.01)
*H03K 19/177*   (2006.01)

(52) U.S. Cl. ........... 710/110; 710/310; 370/359; 326/39

(58) Field of Classification Search ................... 710/110, 710/310; 370/359; 326/39
See application file for complete search history.

(56) References Cited

U.S. PATENT DOCUMENTS

| | | | |
|---|---|---|---|
| 6,034,542 A * | 3/2000 | Ridgeway | 326/39 |
| 6,331,977 B1 | 12/2001 | Spaderna et al. | |
| 6,483,342 B2 * | 11/2002 | Britton et al. | 326/39 |
| 6,691,193 B1 * | 2/2004 | Wang et al. | 710/200 |
| 7,131,125 B2 * | 10/2006 | Modelski et al. | 718/106 |
| 7,167,937 B2 * | 1/2007 | Anjo et al. | 710/110 |
| 7,174,406 B1 * | 2/2007 | Abdallah et al. | 710/240 |
| 7,225,285 B1 * | 5/2007 | Fairman et al. | 710/266 |
| 7,412,556 B2 * | 8/2008 | Dong et al. | 710/316 |
| 7,532,636 B2 * | 5/2009 | Yap et al. | 370/423 |
| 7,774,530 B2 * | 8/2010 | Haug et al. | 710/110 |
| 2002/0023186 A1 * | 2/2002 | Kim | 710/244 |
| 2003/0200451 A1 * | 10/2003 | Evans et al. | 713/193 |
| 2008/0282007 A1 * | 11/2008 | Moran et al. | 710/110 |

FOREIGN PATENT DOCUMENTS

| | | |
|---|---|---|
| JP | 2000-200258 A | 7/2000 |
| JP | 2002-342265 A | 11/2002 |

* cited by examiner

*Primary Examiner* — Mark Rinehart
*Assistant Examiner* — Christopher A Daley
(74) *Attorney, Agent, or Firm* — Miles & Stockbridge P.C.

(57) ABSTRACT

The router which relays a transfer request and a reply between master and slave components has request-control circuits provided therein. The request-control circuits judge the slave component to transfer a request from each master component to, and arbitrate the conflict between requests to one slave component. Further, for the router, a slave-component-allocation-control circuit which variably allocates the slave components to be connected to the request-control circuits to the request-control circuits is adopted. In case that a slave component in connection with one request-control circuit is subjected to no access, changing the allocation of the slave component in connection with the one request-control circuit makes possible to utilize the resource of the one request-control circuit.

15 Claims, 13 Drawing Sheets

Fig. 9

| Name of Slave Component | MEM_I/F | DMAC | PRH | PCI_I/F | GRFC | USB_I/F |
|---|---|---|---|---|---|---|
| Changeover status of Request-control Circuits: ON/OFF | OFF | ON | ON | ON | ON | OFF |
| Number of request-control circuit each component belongs to (initial state) | 0 | 1 | 1 | 1 | 2 | - |
| Number of request-control circuit each component belongs to (after switching) | 0 | 1 | 1 | 1 | 1 | 2 |

$$\begin{pmatrix} 0 : \text{REQCNT0} \\ 1 : \text{REQCNT1} \\ 2 : \text{REQCNT2} \end{pmatrix}$$

SEMICONDUCTOR DEVICE

CLAIM OF PRIORITY

The Present application claims priority from Japanese application JP 2007-285051 filed on Nov. 1, 2007, the content of which is hereby incorporated by reference into this application.

FIELD OF THE INVENTION

The invention relates to improvement in the throughput of a router which relays a transfer request and a reply between circuit modules, and more particularly, to a technique useful for application to a semiconductor device, such as SoC (System on a Chip) with a bus structure for connecting lots of master and slave components e.g. by means of a split transaction bus interface.

BACKGROUND OF THE INVENTION

There is a tendency that the efficiency of access to a slave component by a master component and the throughput of data processing decrease with the increase in the number of circuit modules including a processor incorporated in a SoC for materializing a required data-processing function, a memory and a peripheral circuit. This results from the conflict between requests from master components to a slave component, and the conflict between responses by slave components to a master component, for example.

JP-A-2002-342265 discloses a computer system having the following features: first master components are assigned specialized access buses respectively; second master components are assigned access buses through an aggregate circuit which performs e.g. arbitration of access requests, provided that the number of the busses assigned to the second components is smaller than that of the second master components; and slave components can be connected through select circuits to any access buses.

JP-A-2000-200258 contains the description about a system using a crossbar-switching network which provides selectable access to internal IC nodes from outside interface pins.

SUMMARY OF THE INVENTION

The inventor conducted examination about how to suppress the decrease in bus throughput or data-processing throughput owing to the conflict between requests from master components to a slave component, the conflict between responses from slave components to a master component, and the like. With the technique as disclosed by JP-A-2002-342265, which was found after completion of the invention, an attempt is made to use an aggregate circuit for part of master components thereby to reduce the number of specialized busses for the purpose of increasing the efficiency of access to a slave component by a master component by means of multiplexing of access buses. However, even when a bus which the aggregate circuit has assigned to nothing remains, the action to assign the bus to a master component on the side of the aggregate circuit to use is not taken. Further, the scale of the circuit is large because it is premised on multiplexing of buses. The adoption of the crossbar switch circuit as disclosed in JP-A-2000-200258 offers a superior flexibility in the light of deciding a component to connect with, however enlarges the scale of the circuit.

Before completion of the invention, the inventor examined an arrangement that a router which relays a transfer request and a reply between a master component and a slave component is provided with request-control circuits apiece judging the slave component to transfer a request from each master component to, and arbitrating the conflict between requests to one slave component, and slave components to be connected to the request-control circuits are allocated and connected to the request-control circuits. Initially, it was examined to keep the slave components to be allocated and connected to the request-control circuits in a fixed condition. However, the inventor revealed that in the fixed condition, a resource of the router, which the one request-control circuit forms, is not used effectively when a slave component connected to one request-control circuit is subjected to no access at all, and therefore the bus throughput can drop depending on the details of data processing.

Hence, it is an object of the invention to provide a semiconductor device which can increase the bus access efficiency while the expansion of circuit scale of the router is suppressed.

The above and other objects and novel features of the invention will be apparent from the description hereof and the accompanying drawings.

Of the embodiments herein disclosed, preferred ones will be briefly outlined below.

That is, the router which relays a transfer request and a reply between master and slave components has request-control circuits provided therein; the request-control circuits judge the slave component to transfer a request from each master component to, and arbitrate the conflict between requests to one slave component. Further, for the router, a slave-component-allocation-control circuit which variably allocates the request-control circuits the slave components to be connected to the request-control circuits is adopted. In case that a slave component in connection with one request-control circuit is subjected to no access, changing the allocation of the slave component in connection with the one request-control circuit makes possible to utilize the resource of the one request-control circuit, and thus the throughput of bus access or data processing is increased. In addition, this is not predicated on multiplexing of buses, and a crossbar switch covering the whole is not required. Therefore, the expansion of the circuit scale of the router can be minimized.

Now, the effects offered by the preferred ones of the embodiments herein disclosed are briefly as follows. That is, the expansion of the circuit scale of the router can be minimized, and the efficiency of buss access can be increased.

BRIEF DESCRIPTION OF THE DRAWINGS

FIG. 9 is a table for exemplifying initial setting values of registers;

DETAILED DESCRIPTION OF THE PREFERRED EMBODIMENTS

1. Summary of the Preferred Embodiments

Figure 1:
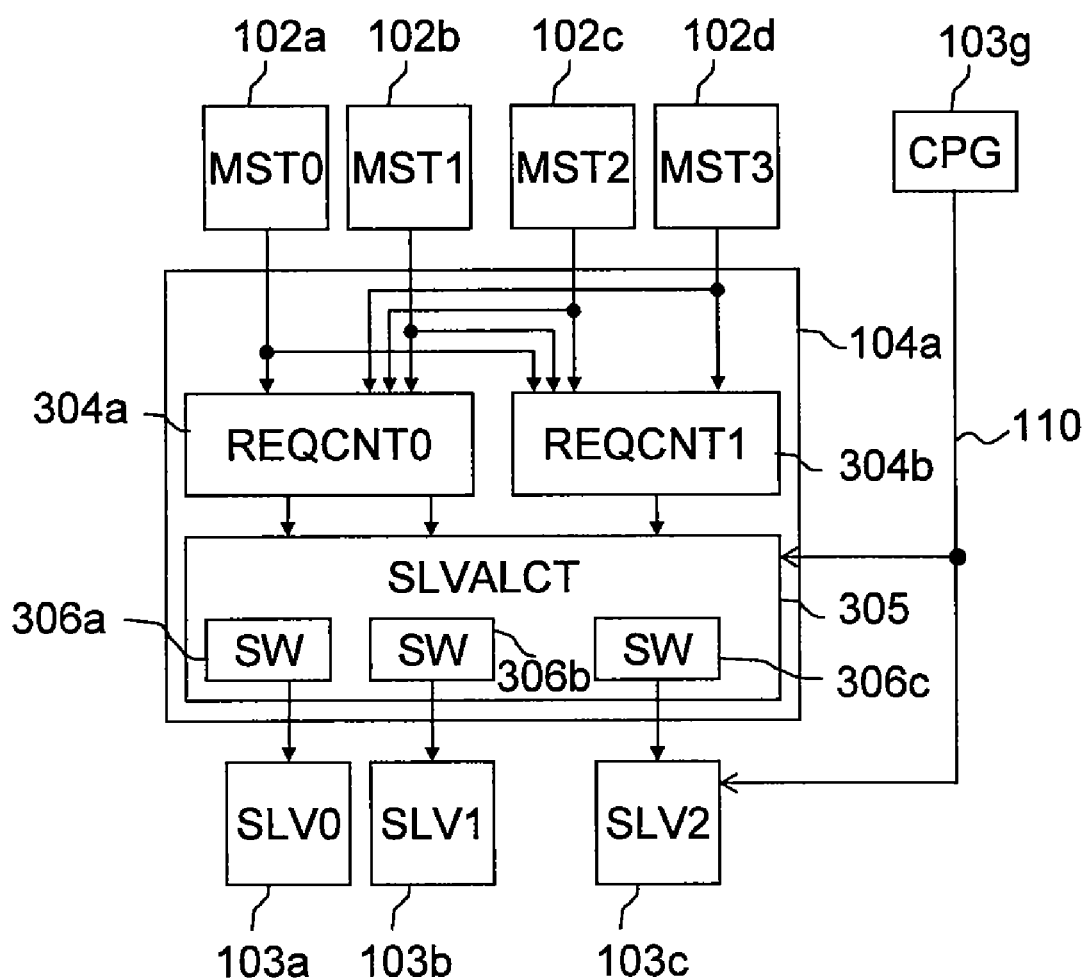
FIG. 1 is a block diagram showing an example of a request-transaction circuit included in a microcomputer as an example of a semiconductor device according to the invention.

First, the preferred embodiments of the invention herein disclosed will be described in outline. Here, the reference numerals, characters and signs for reference to the drawings, which are accompanied with paired round brackets, only exemplify what the concepts of components referred to by the numerals, characters and signs contain.

[1] The semiconductor device has a plurality of master components (102*a*-102*f*) capable of making a request for transfer; a plurality of slave components (103*a*-103*f*) capable of making a reply to the transfer request; and a router (104) which relays the transfer request and reply between the master and slave components. The router has: a plurality of request-control circuits (304, 404) each judging the slave component to transfer a request from each master component to, and arbitrating the conflict between requests to one slave component; and a slave-component-allocation-control circuit (305, 405, 505) variably deciding the slave component which the result of control by the request-control circuit can be passed to for each request-control circuit.

According to this arrangement, in case that a slave component in connection with one request-control circuit is subjected to no access, changing the assignment of the slave component in connection with the one request-control circuit makes possible to utilize the resource of the one request-control circuit, which contributes to the increase in the throughput of bus access or data processing. In addition, this is not predicated on multiplexing of buses, and a crossbar switch covering the whole is not required. Therefore, the expansion of the circuit scale of the router can be minimized.

[2] In the semiconductor device as described in the Item [1], the slave-component-allocation-control circuit has a set of first control registers (320, 321) to set in identification information of the slave components which the results of control by the respective request-control circuits can be passed to, and changes the identification information of the slave components in response of occurrence of a predetermined event. Thus, variable control of assignment of the request-control circuits and slave components can be materialized readily.

[3] In the semiconductor device as described in the Item [2], the slave-component-allocation-control circuit has a set of initial-value-data registers (322, 323) to set in initial values of the identification information of the slave components, and transfers initial values of the initial-value-data registers to the first control registers in response to disappearance of the predetermined event. Thus, the first registers can be reset to the initial values readily.

[4] In the semiconductor device as described in the Item [3], the first control registers and initial-value-data registers are initialized in response to system reset. Thus, initialization of the registers can be facilitated.

[5] In the semiconductor device as described in the Item [2], on appearance of the slave component halted in action, the slave-component-allocation-control circuit changes the identification information of the slave components in the first registers so that a difference between the request-control circuits in number of the slave components in action, which results of control by the request-control circuits can be passed to, falls in a predetermined range on condition that the difference is beyond the predetermined range. Thus, according to the arrangement made focusing on the slave component halted in action, the frequencies of using the request-control circuits can be leveled relatively with ease.

[6] In the semiconductor device as described in the Item [5], the slave component halted in action is created by stopping supply of a synchronous clock signal thereto. However, the slave component in such condition may be created by cutting off the operating power supply.

[7] In the semiconductor device as described in the Item [1], the slave-component-allocation-control circuit (405) has: a set of first data registers (423-425) for storing first data used to determine the identification information of the slave component which a result of control by each request-control circuit can be passed to; and a set of second data register (426-428) for storing second data utilized instead of the first data in response of occurrence of a predetermined event. The allocation of the slave components can be changed immediately in response to occurrence of an event such that a device is attached to or detached from a slave component such as an external I/O interface.

[8] In the semiconductor device as described in the Item [7], the slave-component-allocation-control circuit utilizes the first data instead of the second data in response to disappearance of a predetermined event.

[9] In the semiconductor device as described in the Item [7], the slave-component-allocation-control circuit has a second control register (429) for directing whether or not to change the identification information for each slave module on occurrence of the predetermined event. Thus, undesired change of identification information can be inhibited

[10] In the semiconductor device as described in the Item [2], in case that a period during which no transfer request is accepted continues for a predetermined length of time for each slave component, the slave-component-allocation-control circuit (305) brings the slave component to a halt. Further, the slave-component-allocation-control circuit changes the identification information of the slave components in the first control registers (320, 321) so that a difference between the request-control circuits in number of the slave components in action, which results of control by the request-control circuits can be passed to, falls in a predetermined range on condition that the difference is beyond the predetermined range. Thus, according to the arrangement made focusing on a state of each slave component with no transfer request thereto, the frequencies of using the request-control circuits can be leveled relatively with ease.

[11] In the semiconductor device as described in the Item [10], the slave-component-allocation-control circuit has a set of third control registers (511-513) for defining the predetermined length of time. Thus, the period during which there is not transfer request with respect to the slave components can be set as desired.

[12] The embodiment of the invention arranged focusing on the request control can apply to response control. Specifically, in a semiconductor device having the plurality of master components, the plurality of slave components and the router, the router has a plurality of response-control circuits (604) each judging the master component to transfer a reply from each slave component to, and arbitrating conflict between replies to one master component, and a master-component-allocation-control circuit (605) variably deciding the master component which a result of control by the response-control circuit can be passed to for each response-control circuit.

According to this arrangement, in case that a master component in connection with one response-control circuit is subjected to no access, changing the assignment of the master component in connection with the one response-control circuit makes possible to utilize the resource of the one response-control circuit, which contributes to the increase in the throughput of bus access or data processing. In addition, this is not predicated on multiplexing of buses, and a crossbar switch covering the whole is not required. Therefore, the expansion of the circuit scale of the router can be minimized.

[13] The invention can be applied to both the request control and response control. Therefore, in a semiconductor device having the plurality of master components, the plurality of slave components and the router, the router has: a plurality of request-control circuits each judging the slave component to transfer a request from each master component to, and arbitrating conflict between requests to one slave component; a slave-component-allocation-control circuit variably deciding the slave component which a result of control by the request-control circuit can be passed to for each request-control circuit; a plurality of response-control circuits each judging the master component to transfer a reply from each slave component to, and arbitrating conflict between replies to one master component; and a master-component-allocation-control circuit variably deciding the master component which a result of control by the response-control circuit can be passed to for each response-control circuit.

2. Details of the Preferred Embodiments

Now, the embodiments will be described further in detail.
<<Microcomputer>>

Figure 3:
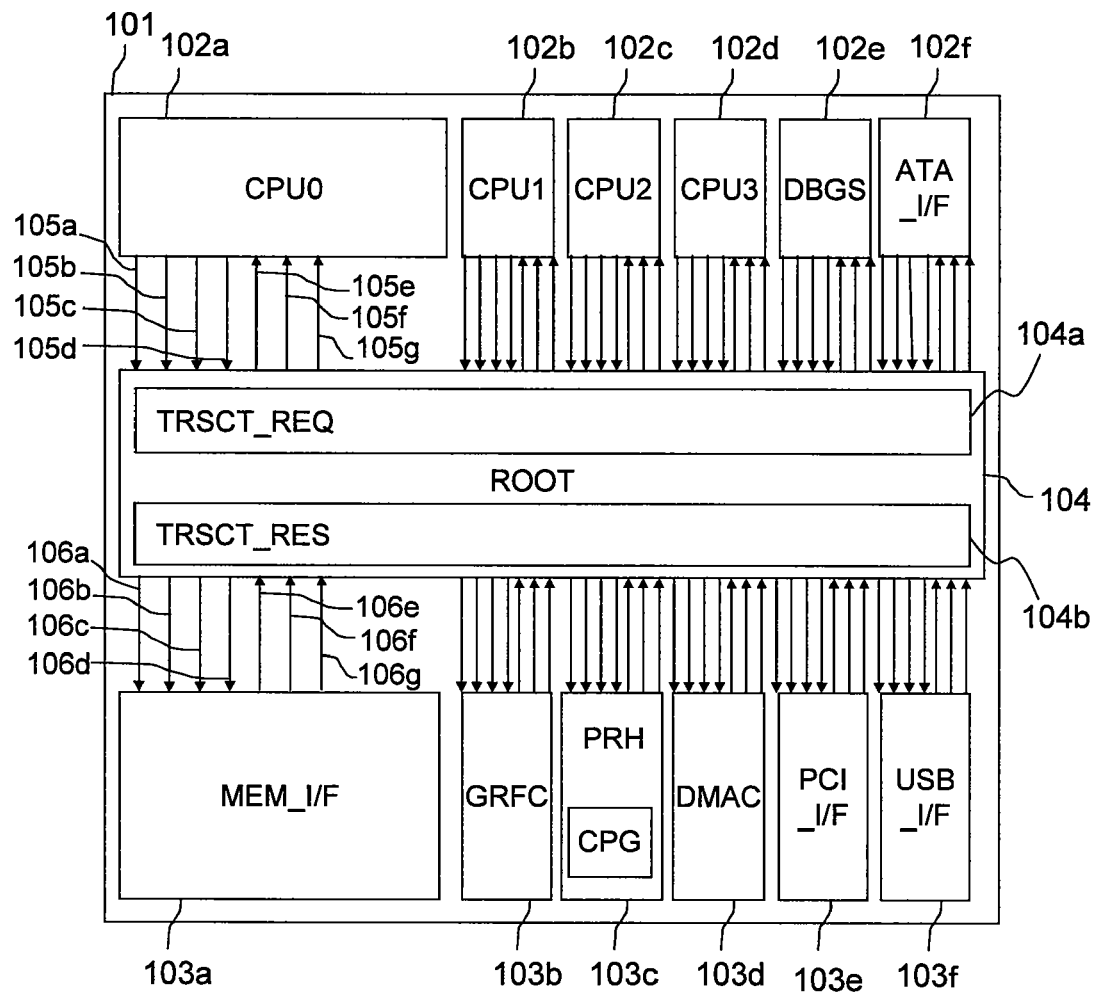
FIG. 3 is a block diagram which shows a microcomputer as an example of a semiconductor device according to the invention.

Referring to FIG. 3, a microcomputer 101 is exemplified as an example of the semiconductor device according to the invention. The microcomputer 101 is formed on a semiconductor substrate, as e.g. an SoC, by a complementary MOS IC technology or the like. For a MOS transistor formed in such form, SOI (Silicon on Insulator) structure or a bulk structure that transistors are separated by well isolation according to e.g. conductivity types may be adopted.

The microcomputer 101 uses a split transaction bus interface for internal bus interface. In the bus architecture, the microcomputer 101 includes, as master components which can cause a transfer request, e.g. four central processing units (CPU0-CPU3) 102a-102d, a debug-supporting unit (DBGS) 102e, and an ATA interface circuit (ATA_I/F) 102f. These master components 102a-102f are also referred to as "master component 102" simply. Further, in this bus architecture, the microcomputer 101 includes, as slave components operable to respond to a transfer request, a memory interface circuit (MEM_I/F) 103a arranged so that e.g. a synchronous DRAM of a double data rate can be connected thereto from the outside, a graphic processing unit (GRFC) 103b, a PCI interface circuit (PCI_I/F) 103d, a USB interface circuit (USB_I/F) 103f, and other peripheral circuit (PRH) 103c. These slave components 103a-103f are also referred to as "slave component 103" simply. Between the master and slave components, a router (ROOT) 104 for relaying a transfer request and a reply is connected.

In the split transaction bus interface, a master component means a circuit which can cause a transfer request and accept a reply to the request; a slave component means a circuit which can receive a transfer request, and send back a reply to the request. Therefore, even one circuit can have both of the functions of master and slave components. In regard to the specific examples of master and slave components shown in FIG. 3, attention is focused on only one function of each component. For example, it has been stated that each central processing unit is a master component, however it can serve as a slave component by which a particular internal circuit is made accessible from the outside in a particular operation mode such as a debug mode.

The other peripheral circuit 103c includes e.g. a clock pulse generator (CPG) 103g. The clock pulse generator 103g produces a synchronous clock signal of an internal circuit based on a system clock supplied from the outside or a clock resulting from self-oscillation of a resonator, and supplies the internal circuit with the clock signal thus produced. The microcomputer 101 has a low-power-consumption mode. For example, the central processing unit 102a rewrites low-power-consumption-control data in a clock control register inside the clock pulse generator 103g according to its operation program, whereby supply of a synchronous clock to the internal circuit specified by the low-power-consumption-control data is stopped.

Referring to FIG. 3, input and output signals between the central processing unit 102a, which is one of the master components, and the router 104 are exemplified. The central processing unit 102a outputs the following to the router: a request (req) 105a, which is a transfer request from a master component; a source data (src) 105b for identifying the master component which has issued a request; a transfer request destination address (add) 105c showing the destination of a transfer request; and a response grant signal (r_gnt) 105d serving as an acceptance-allowed signal showing that acceptance of a response signal (res) from a slave component has been allowed. Also, the central processing unit 102 receives the following from the router 104: a grant signal (gnt) 105f showing the status of the router accepting a request signal 105a; a response (res) 105e, which is a reply passed from a slave component to the router; and a response source (r_src) 105g showing ID of the master component, which is the destination of a reply from the router. Likewise, the other master components output and input the same signals as the above-described ones to the router 104.

Also, in FIG. 3 are exemplified input and output signals between the memory interface circuit 103a, which is one of the slave components, and the router 104. The following are input to the memory interface circuit 103a from the router 104: a request (req) 106a, which is a transfer request issued to the router 104 from one master component; source data (src) 106b for identifying the master component corresponding to the request 106a; a transfer request destination address (add) 106c showing the transfer destination corresponding to the request 106a; and a response grant signal (r_gnt) 106d serving as an acceptance-allowed signal showing that acceptance of a response (res) 106e from the memory interface 103a has been allowed. The memory interface circuit 103a outputs the following to the router 104: a response (res) 106*e* as a reply to the router 104; a grant signal (gnt) 106*f* showing the status of acceptance of the request 106*a* from the router 104; and a response source (r_src) 106*g* showing which master component to reply to. Likewise, the other slave components output and input the same signals as the above-described ones to the router 104.

The router 104 performs routing of transfer requests and replies based on the signals 105*a*-105*g* and 106*a*-106*g*. The router 104 has a request-transaction circuit (TRSCT_REQ) 104*a* which performs processing of a transfer request issued by the master component, and a response-transaction circuit (TRSCT_RES) 104*b* which perform processing of a reply to a transfer request issued by the master component. Now, it is noted that the signals 105*a*-105*d* output to the router 104 from the master component 102 are simply referred to as "requester signals 105"; the signals 106*a*-106*d* supplied to the slave component 103 from the router 104 are just referred to as "requester signal 106". Likewise, the signals 106*e*-106*g* supplied to the router 104 from the slave component 103 are simply referred to as "responder signal 106"; the signals 105*e*-105*g* supplied to the master component 102 from the router 104 are just referred to as "responder signal 105".

<<First Example of the Request-Transaction Circuit 104*a*>>

FIG. 1 shows an example of the request-transaction circuit 104*a*. In the drawing, four master components (MST0-MST3) 102*a*-102*d* and three slave components (SLV0-SLV2) 103*a*-103*c* are shown representatively for the sake of simplicity. The request-transaction circuit 104*a* has: request-control circuits (REQCNT0, REQCNT1) 304*a* and 304*b*; and a slave-component-allocation-control circuit (SLVALCT) 305. The request-control circuits (REQCNT0, REQCNT1) 304*a* and 304*b* judge the slave component to transfer a request from each master component to according to address decoding, and arbitrate the conflict between requests to one slave component according to the chronological or reverse chronological order of appearance of the requests, a predetermined order of priorities, or the like. The slave-component-allocation-control circuit (SLVALCT) 305 variably decides the slave components which the results of control by the request-control circuits 304*a* and 304*b* can be passed to, provided that the decision is made for each request-control circuit. The switch (SW) 306*a*, which is shown conceptually, is a circuit for selecting one of the slave components 103*a*-103*c*, which will make a destination of supply of a transfer request output by the request-control circuit 304. Other switches (SW) 306*b* and 306*c* work likewise. In the drawing, the routes leading to the slave components drawn just below the switches are shown as routes from the switches 306*a*-306*c* representatively.

Figure 2:
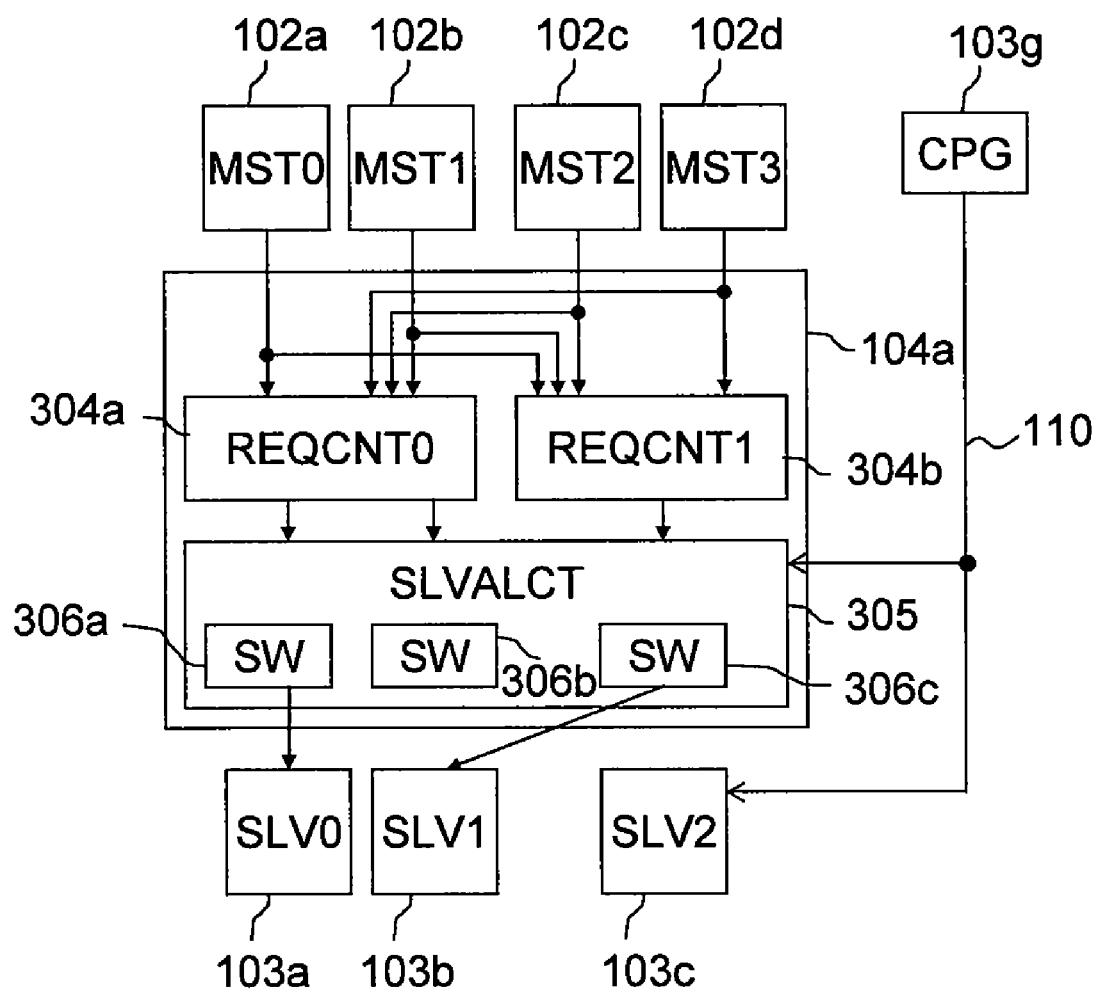
FIG. 2 is a block diagram showing a situation of the request-transaction circuit when the action of part of slave components is stopped.
Figure 14:
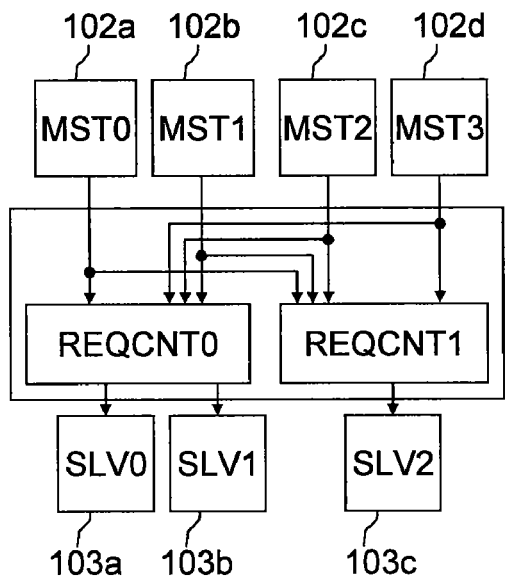
FIG. 14 is a block diagram showing an example of a request-transaction circuit involved in a comparative example examined by the inventor prior to completion of the invention.

In the drawing is shown a situation that the slave-component-allocation-control circuit 305 puts the request-control circuit 304*a* in charge of judgment and arbitration on requests for transfer to the slave components 103*a* and 103*b*, and the request-control circuit 304*b* in charge of judgment and arbitration on requests for transfer to the slave component 103*c*. Hence, the slave-component-allocation-control circuit 305 provides a transfer request from the request-control circuit 304*a* for the slave component 103*a* or 103*b*, and a transfer request from the request-control circuit 304*b* for the slave component 103*c*. During such actions, the request-control circuit 304*b* is not used as an effective resource for the judgment and arbitration on the condition that a clock stop signal 110 from the clock pulse generator 103*g* brings the action of the slave component 103*c* to a halt. FIG. 2 shows an example of the situation when such condition is canceled. Specifically, when the action of the slave component 103*c* is stopped by a clock stop signal or the like, the slave-component-allocation-control circuit 305 puts the request-control circuit 304*a* in charge of judgment and arbitration on requests for transfer to the slave component 103*a*, and the request-control circuit 304*b* in charge of judgment and arbitration on requests for transfer to the slave component 103*b*. Therefore, the slave-component-allocation-control circuit 305 provides a transfer request from the request-control circuit 304*a* for the slave component 103*a*, and a transfer request from the request-control circuit 304*b* for the slave component 103*b*. Consequently, the request-control circuits 304*a* and 304*b* are both used as resources for the judgment and arbitration as described above, and the load on the request-control circuit 304*a* in control is lightened in comparison to the case that only the request-control circuit 304*a* performs judgment and arbitration for the slave components 103*a* and 103*b*, whereby the access throughput with respect to slave components, and therefore the throughput of data processing by each master component are increased. In short, the throughput of the router can be increased by dynamically switching resources so that an unoccupied resource can be utilized. For example, in case that the slave component 103*c* is not used, the request-control circuit 304*a* is dedicated to control of the slave component (SLV0) 103*a* by lightening the load on the request-control circuit 304*a* in control, whereby a control mode that particularly the efficiency of the action of access through the slave component (SLV0) 103*a* is increased can be materialized. In case that the slave-component-allocation-control circuit 305 is not adopted as shown by a comparative example of FIG. 14, the slave component 103*c* is not utilized. In such case, the one request-control circuit (REQCNT1) is not used at all. Thus, a control mode such that the request-control circuit 304*a* is dedicated to control of the slave component (SLV0) 103*a* by lightening the load on the request-control circuit 304*a* in control, thereby increasing the efficiency of the action of access through the slave component (SLV0) 103*a* cannot be realized.

Figure 4:
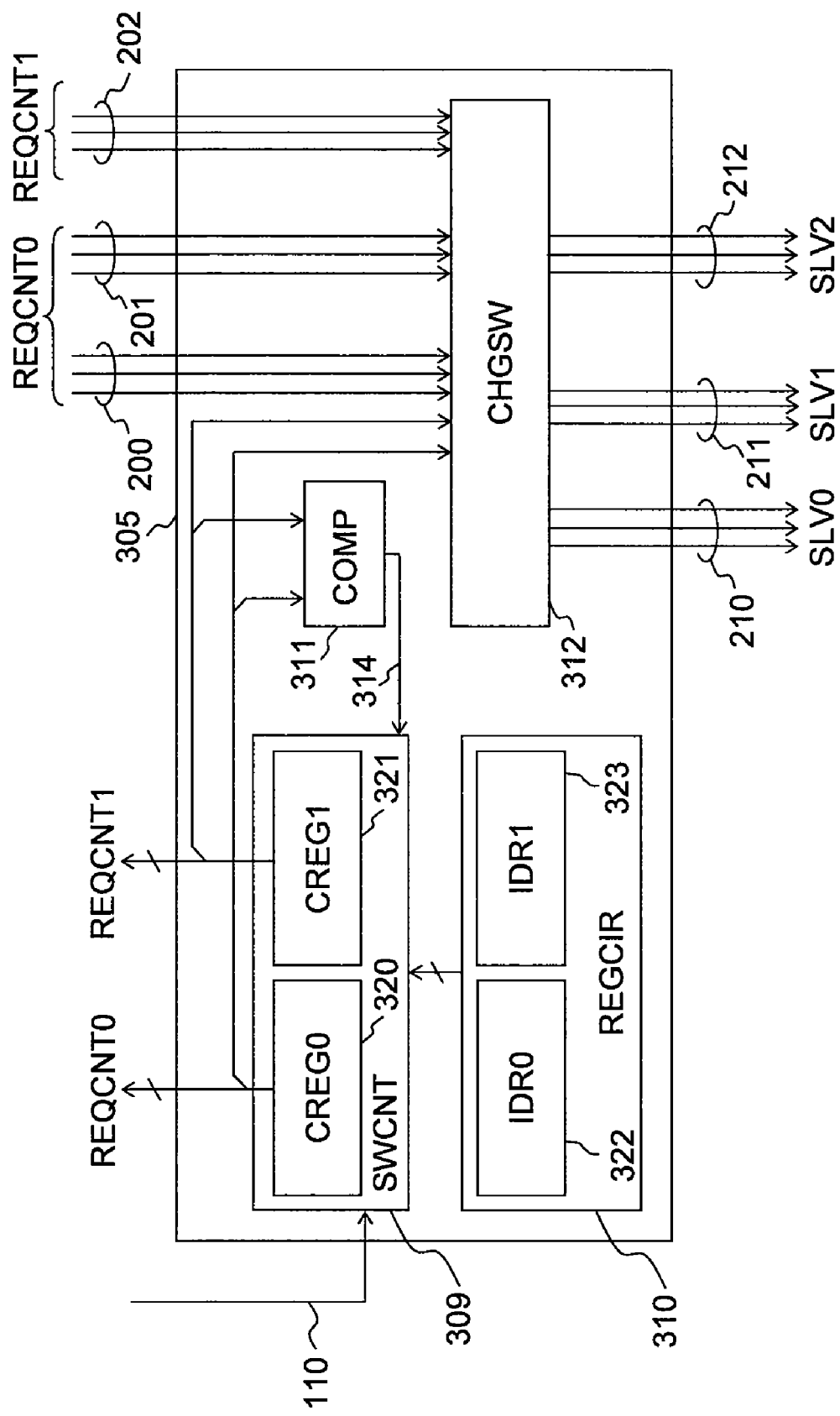
FIG. 4 is a block diagram showing an example of a slave-component-allocation-control circuit further in detail.

Referring to FIG. 4, an example of the slave-component-allocation-control circuit 305 is shown further in detail. The slave-component-allocation-control circuit 305 has: a switch-control circuit (SWCNT) 309; a register circuit (REGCIR) 310; a comparator circuit (CMP) 311; and a changeover switch circuit (CHGSW) 312. The switch-control circuit 309 has first control registers (CREG0, CREG1) 320 and 321 to set in pieces of identification information (belonging component IDs) of the slave components which the results of control by the respective request-control circuits 304*a* and 304*b* can be passed to. In the first control register 320, the component ID of the slave component which the request-control circuit 304*a* has charge of as a target for judgment and arbitration is set. (Such slave component is also referred to as the "component belonging to the request-control circuit 304*a*".) In the first control register 321, the component ID of the slave component which the request-control circuit 304*b* has charge of as a target for judgment and arbitration is set. (Such slave component is also referred to as the "component belonging to the request-control circuit 304*b*".) The initial values of the first control registers 320 and 321 are maintained by data registers (IDR0) 322 and (IDR1) 323 of the register circuit 310. The initial settings of the registers 320-323 may be made through reset of the system by means of hardware, or a predetermined master component such as a central processing unit executing an initialization program in response to cancel of the reset. According to the example of FIG. 1, the first control register 320 has the component IDs of the slave components SLV0 and SLV1 initially set therein, and the first control register 321 has the component ID of the slave component SLV2 initially set therein. The switch-control circuit 309 makes the first control registers 320 and 321 rewritable autonomously. The first control registers 320 and 321 are reset to the initial values in response to internal transfer of the values of the data registers 322 and 323. The request-control circuit 304a recognizes the slave component to be controlled, based on the value of the register 320. The request-control circuit 304b recognizes the slave component to be controlled based on the value of the register 321.

The outputs 200 and 201 of the request-control circuit 304a include the results of judgment and arbitration to deal with the belonging component specified by the register 320. The output 202 of the request-control circuit 304b includes the results of judgment and arbitration to deal with the belonging component specified by the register 321. The outputs 200, 201 and 202 each include: a request (req); source data (src) for identifying the master component which has issued the request; and an operation enable signal for the slave component recognized by decoding a transfer request destination address (add) indicating the destination of a transfer request.

The outputs 210, 211 and 212 of the changeover switch circuit 312 are coupled to the slave components (SLV0) 103a, (SLV1) 103b and (SLV2) 103c, respectively. The changeover switch circuit 312 has a crossbar switch circuit structure capable of connecting the inputs 200-202 to appropriate outputs 210-212. The connection control of the switch circuit is performed according to the values of the registers 320 and 321. For example, in case that the settings of the registers 320 and 321 are as in the condition as described with reference to FIG. 1, the output 200 or 201 of the request-control circuit 304a is reflected by the output 210 or 211 of the changeover switch circuit 312, and the output 202 of the request-control circuit 304b is reflected by the output 212 of the changeover switch circuit 312. In contrast, in case that settings of the registers 320 and 321 are as in the condition as described with reference to FIG. 2, the output 200 or 201 of the request-control circuit 304a is reflected by the output 210 of the changeover switch circuit 312, and the output 202 of the request-control circuit 304b is reflected by the output 211 of the changeover switch circuit 312.

Now, the control mode for changing the setting values of the registers 320 and 321 will be described with reference to FIG. 4. On receipt of a notification of the slave component with its action halted through the clock stop signal 110, the switch-control circuit 309 clears the component ID of the slave component in question from the registers 320 and 321 according to the notification. The comparator circuit (COMP) 311 compares the number of the slave components which can be grasped from the belonging component IDs of the request-control circuit 304a set in the register 320 with the number of the slave components which can be grasped from the belonging component IDs of the request-control circuit 304b set in the register 321. The comparator circuit (COMP) uses a signal 314 to notify the switch-control circuit 309 of e.g. whether or not the difference of the number of the component IDs of the request-control circuit 304b with respect to that of the request-control circuit 304a is not less than two. When detecting the difference of two or larger based on the signal 314 after reception of the notification by the clock stop signal 110 that the action of part of the slave components is halted, the switch-control circuit 309 changes the values of the registers 320 and 321 properly. For example, at the time of appearance of the slave component halted by the clock stop signal, if the difference between the request-control circuits in the number of the slave components, which the results of control by the request-control circuits can be passed to, and whose actions have not been halted is beyond a predetermined range, the slave-component-allocation-control circuit 305 changes the component IDs of the registers 320 and 321 so that the difference falls in the predetermined range. The slave-component-allocation-control circuit 305 re-allocates, in ascending or descending order of the component IDs, the two registers 320 and 321 information pieces of the request-control circuits to which the operable slave components belong so that the difference is made smaller than two, for example. The predetermined range is not limited to a range such that the difference is kept below two, and it may be changed according to the system appropriately.

Figure 5:
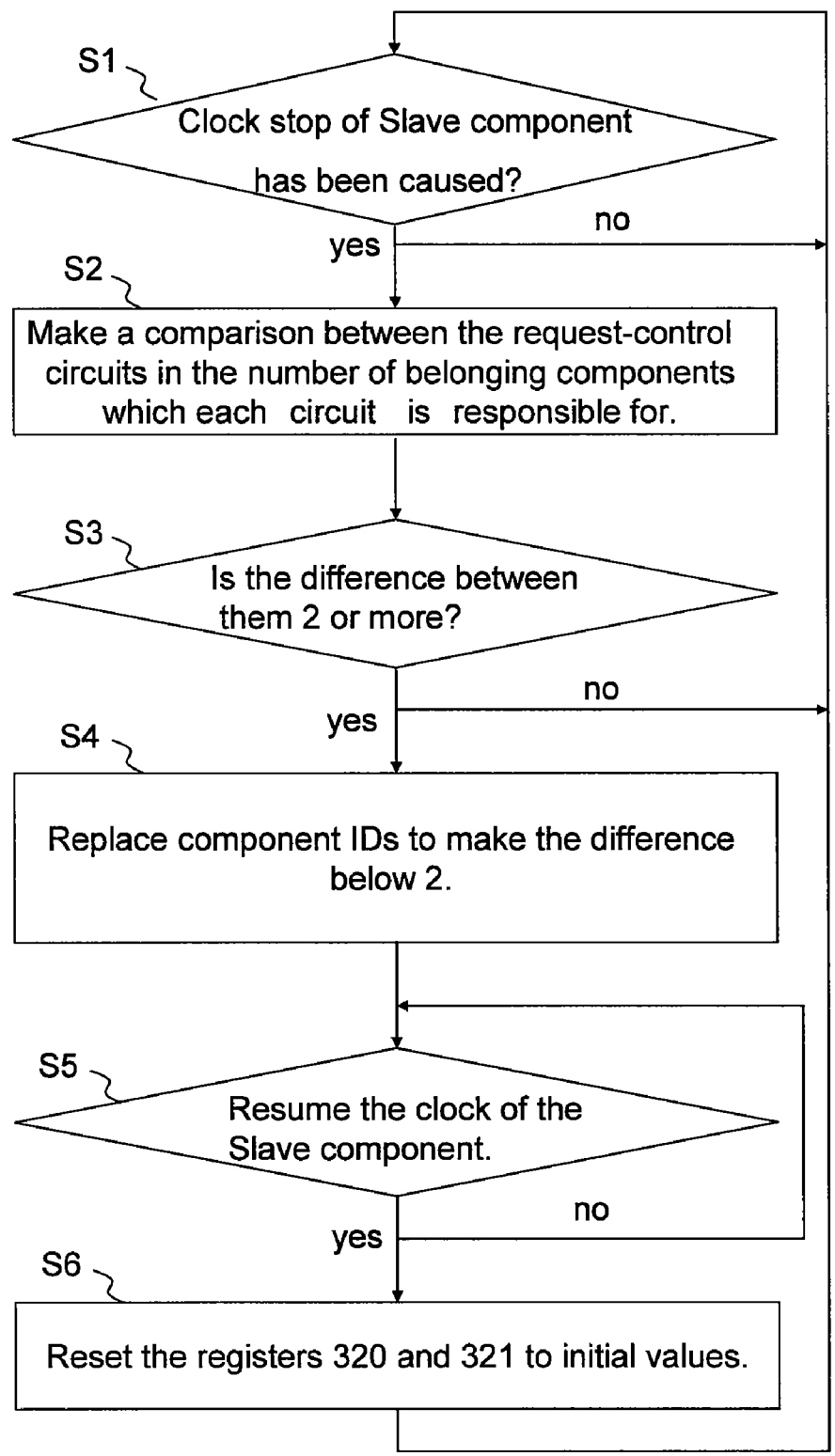
FIG. 5 is a flow chart showing an example of the flow of the action of changing the value of each control register.

Referring to FIG. 5, the flow of the operation of changing the values of the control registers 320 and 321 is exemplified. When a clock stop of the slave component 103c is detected based on the clock stop signal 110 (S1), the comparator circuit 311 makes the comparison (S2) as described above. As a result, in case that it is detected that the difference in the number of belonging components between the request-control circuits 304a and 304b is not less than two (S3), the register circuit 310 replaces the component IDs in the registers 320 and 321 to make the difference below two (S4). For example, supposing the initial state as shown in FIG. 1, the control register 320 has the component IDs of the slave components SLV0 and SLV1, and the register 321 holds the component ID of the slave component SLV2. When the clock stop is directed, the component ID of the slave component SLV2 which the control register 321 holds is cleared therefrom. In this condition, the comparator circuit 311 makes a comparison between the values of the control registers 320 and 321, and sends the result of the comparison back to the switch-control circuit 309 by means of the signal 314. On receipt of the signal, the switch-control circuit 309 rewrites the component ID of the slave component SLV0 into the control register 320, and the component ID of the slave component SLV1 into the control register 321 in the process of Step S4. Thus, the state as shown in FIG. 2 is achieved. After that, supply of the clock to the slave component (SLV2) 103c is resumed. When detecting resumption of the clock supply (S5), the switch-control circuit 309 transfers the initial values of the control registers 322 and 323 to the control registers 320 and 321 internally, and then the mode of control by the control circuit 305 is reset to its initial state.

Thus, the frequencies of using the request-control circuits can be leveled relatively with ease focusing attention on the slave component with the clock stopped. In addition, the measure like this can be taken against not only such clock stop but also selective cutoff of operating power supply.

<<Second Example of the Request-Transaction Circuit 104a>>

Figure 6:
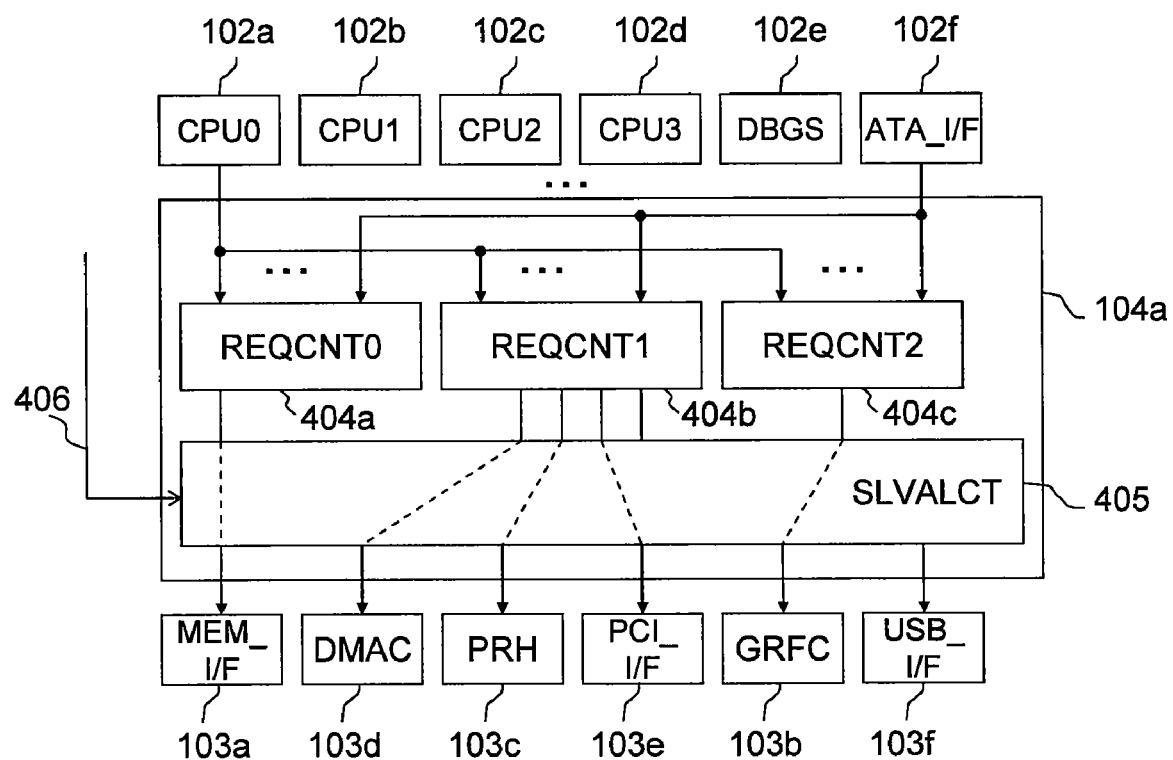
FIG. 6 is a diagram showing the second example of the request-transaction circuit.
Figure 7:
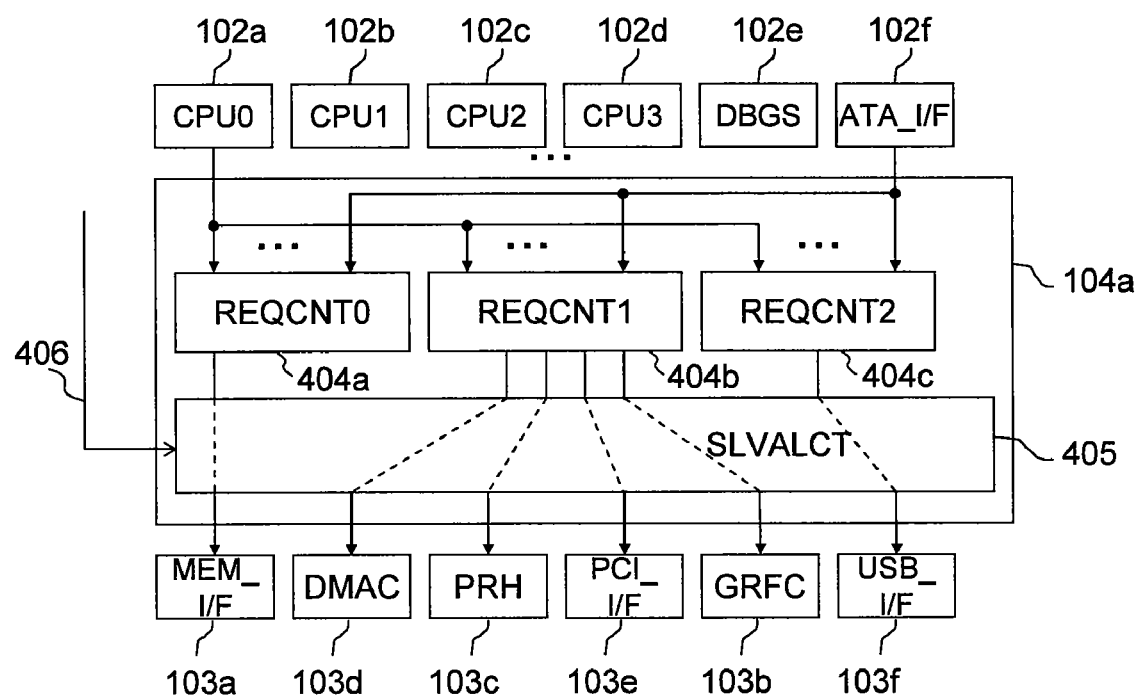
FIG. 7 is a block diagram showing a situation of the request-transaction circuit when the action of part of the slave components is stopped in the example of FIG. 6.

Referring to FIGS. 6 and 7, the second example of the request-transaction circuit 104a is shown. In the drawings, the master components 102a-102f and the slave components 103a-103f are arranged as are the corresponding ones shown in FIG. 3. Here is shown an example of an SoC intended for car navigation. FIG. 6 presents the status of connection of a requester signal when a removable USB memory having an interface such as an USB is not been attached. FIG. 7 presents the status of connection of the requester signal when the USB memory is attached.

The request-transaction circuit 104a has three request-control circuits (REQCNT0-REQCNT2) 404a-404c, and a slave-component-allocation-control circuit (SLVALCT) 405. The request-control circuits 404a-404c judge the slave component to transfer a request from each master component to according to address decoding, and arbitrate the conflict between requests to one slave component according to the chronological or reverse chronological order of appearance of the requests, a predetermined order of priorities, or the like. The slave-component-allocation-control circuit (SLVALCT) 405 variably decides the slave components which the results of control by the request-control circuits 404a-404c can be passed to, provided that the decision is made for each request-control circuit.

FIG. 6 shows a situation that the slave-component-allocation-control circuit 405 puts the request-control circuit 404a in charge of judgment and arbitration on requests for transfer to the slave component (MEM_I/F) 103a, and the request-control circuit 404b in charge of judgment and arbitration on requests for transfer to the slave components (DMAC) 103d, (PHR) 103c and (PCI_I/F) 103e, and the request-control circuit 404c in charge of judgment and arbitration on requests for transfer to the slave component (GRFC) 103b. Hence, the slave-component-allocation-control circuit 405 provides a transfer request from the request-control circuit 404a for the slave component 103a, a transfer request from the request-control circuit 404b for at least one of the slave components 103c-103e, and a transfer request from the request-control circuit 404c for the slave component 103b. Now, in this situation, none of the request-control circuits 404a-404c is put in charge of the slave component (USB_I/F) 103f. This is because the slave-component-allocation-control circuit 405 has been notified by means of external USB memory attachment information 406 that an external USB memory has not been attached to the slave component (USB_I/F). In this situation, the slave component belonging to the request-control circuit 404a is only the slave component (MEM_I/F) 103a, and the slave component belonging to the request-control circuit 404c is only the slave component (GRFC) 103b. Therefore, a high throughput can be achieved in access to the slave components, MEM_I/F 103a and GRFC 103b.

FIG. 7 shows a situation when the slave-component-allocation-control circuit 405 is notified by means of external USB memory attachment information 406 that an external USB memory has been attached to the slave component (USB_I/F). In this case, the slave-component-allocation-control circuit 405 puts the request-control circuit 404a in charge of judgment and arbitration on requests for transfer to the slave component (MEM_I/F) 103a, the request-control circuit 404b in charge of judgment and arbitration on requests for transfer to the slave components (DMAC) 103d, (PHR) 103c, (PCI_I/F) 103e and (GRFC) 103b, and the request-control circuit 404c in charge of judgment and arbitration on requests for transfer to the slave component (USB_I/F) 103f. Hence, the slave-component-allocation-control circuit 405 provides a transfer request from the request-control circuit 404a for the slave component 103a, a transfer request from the request-control circuit 404b for at least one of the slave components 103b-103e, and a transfer request from the request-control circuit 404c for the slave component 103f. In this situation, the slave component belonging to the request-control circuit 404a is only the slave component (MEM_I/F) 103a, and the slave component belonging to the request-control circuit 404c is only the slave component (USB_I/F) 103f. Therefore, a high throughput can be achieved in access to the slave components, MEM_I/F 103a and USB_I/F 103f. Especially, even in case of supposing that a request for down load of a large volume of data such as stream data from a USB memory is issued by a master component successively, the throughput of data access can be increased significantly in this embodiment.

Figure 8:
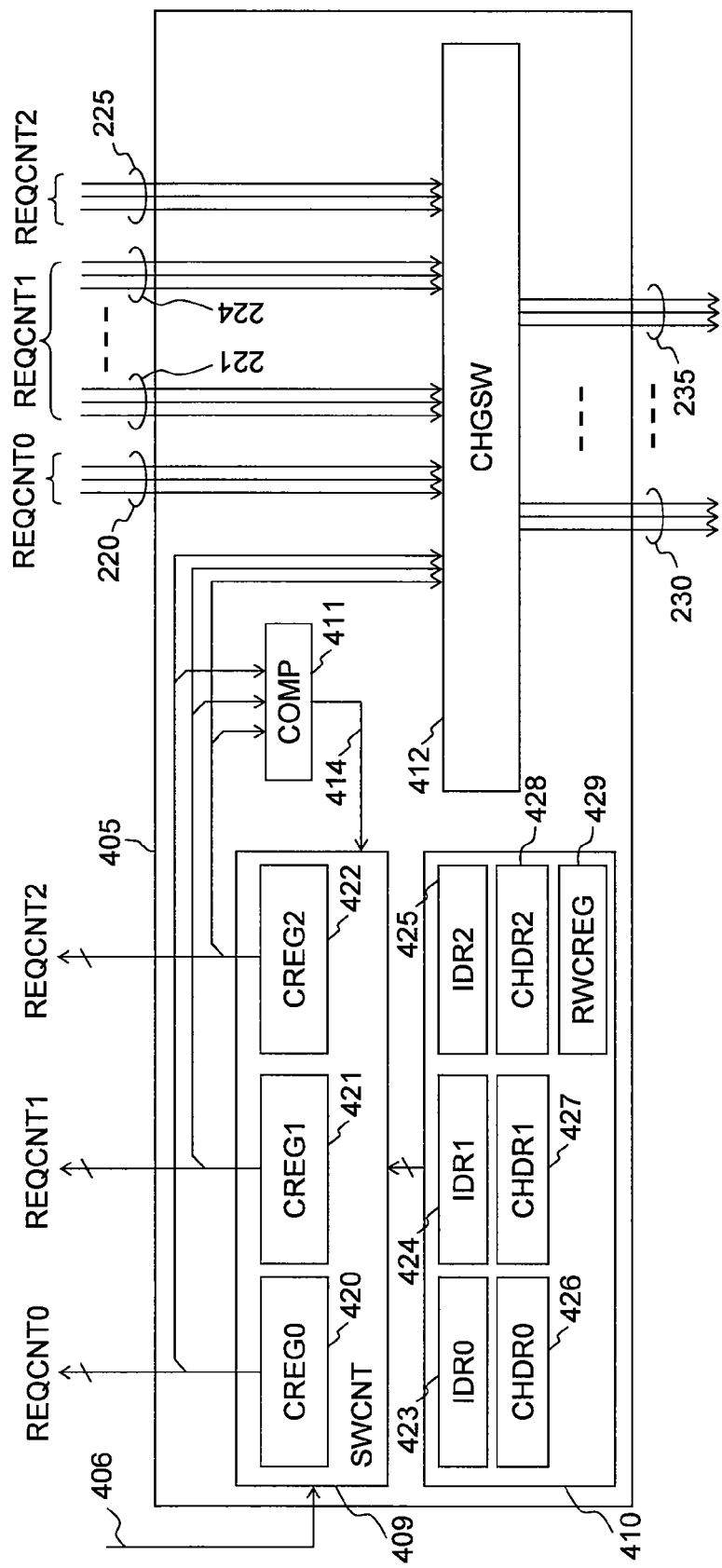
FIG. 8 is a block diagram showing an example of a slave-component-allocation-control circuit further in detail.

Referring to FIG. 8, an example of the slave-component-allocation-control circuit 405 is shown further in detail. Specifically, the slave-component-allocation-control circuit 405 has: a switch-control circuit (SWCNT) 409; a register circuit (REGCIR) 410; a comparator circuit (CMP) 411; and a changeover switch circuit (CHGSW) 412. The switch-control circuit 409 has first control registers (CREG0, CREG1, CREG2) 420-422 to set in pieces of identification information (belonging component IDs) of the slave components to which the results of control by the request-control circuits 404a-404c can be passed. In the first control register 420, the component ID of the slave component which the request-control circuit 404a has charge of as a target for judgment and arbitration is set. (Such slave component is also referred to as the "component belonging to the request-control circuit 404a".) In the first control register 421, the component ID of the slave component which the request-control circuit 404b has charge of as a target for judgment and arbitration is set. (Such slave component is also referred to as the "component belonging to the request-control circuit 404b".) In the first control register 422, the component ID of the slave component which the request-control circuit 404c has charge of as a target for judgment and arbitration is set. (Such slave component is also referred to as the "component belonging to the request-control circuit 404c".) The register circuit 410 has: first data registers (IDR0-IDR2) 423-425; second data registers (CHDR0-CHDR2) 426-428; and a second control register 429. In the first data registers 423-425, initial setting data of data (first data) of the belonging components ID are stored; the storage is performed for each switch-control circuit. The second data registers 426-428 are utilized to store data (second data) of the belonging component ID used instead of the first data in case that attachment of a USB memory is directed with a USB memory attachment signal 406. When the USB memory is detached, the switch-control circuit 409 uses the first data instead of the second data. The second control register 429 is used to store control data for directing whether or not to change the belonging component ID for each slave component at the time of attachment of a USB memory. The initial settings of the registers 420-429 may be made through reset of the system by means of hardware, or a predetermined master component such as a central processing unit executing an initialization program in response to cancel of the reset. According to the example of FIGS. 6 and 7, the initial setting values of the registers 423-429 are as exemplified by FIG. 9. The switch-control circuit 409 makes the first control registers 420-422 rewritable autonomously. The first control registers 420-422 are reset to the initial values in response to internal transfer of the values of the data registers 423-425. In case that attachment of a USB memory is detected, the values of the data registers 426-428 are transferred inside to rewrite the first control register 420-422. In the example of FIG. 9, the second control register 429 directs that the switching of the request-control circuit which the slave component MEM_I/F 102a and USB_I/F 103f belong to be not allowed (OFF). Hence, even in case that the initial values specified by the registers 423 and 425 differ from the changes of values specified by the registers 426 and 428 in the slave components MEM_IF 102a and USB_I/F 103f, the difference is ignored. The request-control circuit 404a recognizes the slave components to control based on the value of the register 420. The request-control circuit 404b recognizes the slave component to control based on the value of the register 421. The request-control circuit 404c recognizes the slave component to control based on the value of the register 422.

The output 220 of the request-control circuit 404a includes the results of judgment and arbitration to deal with the belonging component specified by the register 420. The outputs 221-224 of the request-control circuit 404b include the results of judgment and arbitration to deal with the belonging component specified by the register 421. The output 225 of the request-control circuit 404c includes the results of judgment and arbitration to deal with the belonging component specified by the register 422. The outputs 220-225 each include: a request (req); source data (src) for identifying the master component which has issued the request; and an operation enable signal for the slave component recognized by decoding a transfer request destination address (add) indicating the destination of a transfer request.

The outputs 230-235 of the changeover switch circuit 412 are coupled to the slave components 103a-103f. The changeover switch circuit 412 has a crossbar switch circuit structure capable of connecting the inputs 220-225 to appropriate outputs 230-235. The connection control of the switch circuit is performed according to the values of the registers 420-422.

Now, the control mode for changing the setting values of the registers 420-422 will be described with reference to FIG. 8. First, in case that attachment of an USB memory has been detected based on the USB memory attachment information 406, the registers 420-422 are rewritten with the values of the data registers 426-428. According to the example of FIGS. 6 and 7, it is possible to put priority on the access to the external USB memory. In the second example, the slave components, MEM_I/F 103a and USB_I/F 103f are provided with resources fixedly and therefore, the comparator circuit (COMP) 411 becomes unuseful, dynamic assignment is not performed. Turning ON the slave components MEM_I/F 103a and USB_I/F 103f by the resource changeover registers 423-429 of FIG. 9 enables dynamic assignment.

<<Third Example of the Request-Transaction Circuit 104a>>

Figure 10:
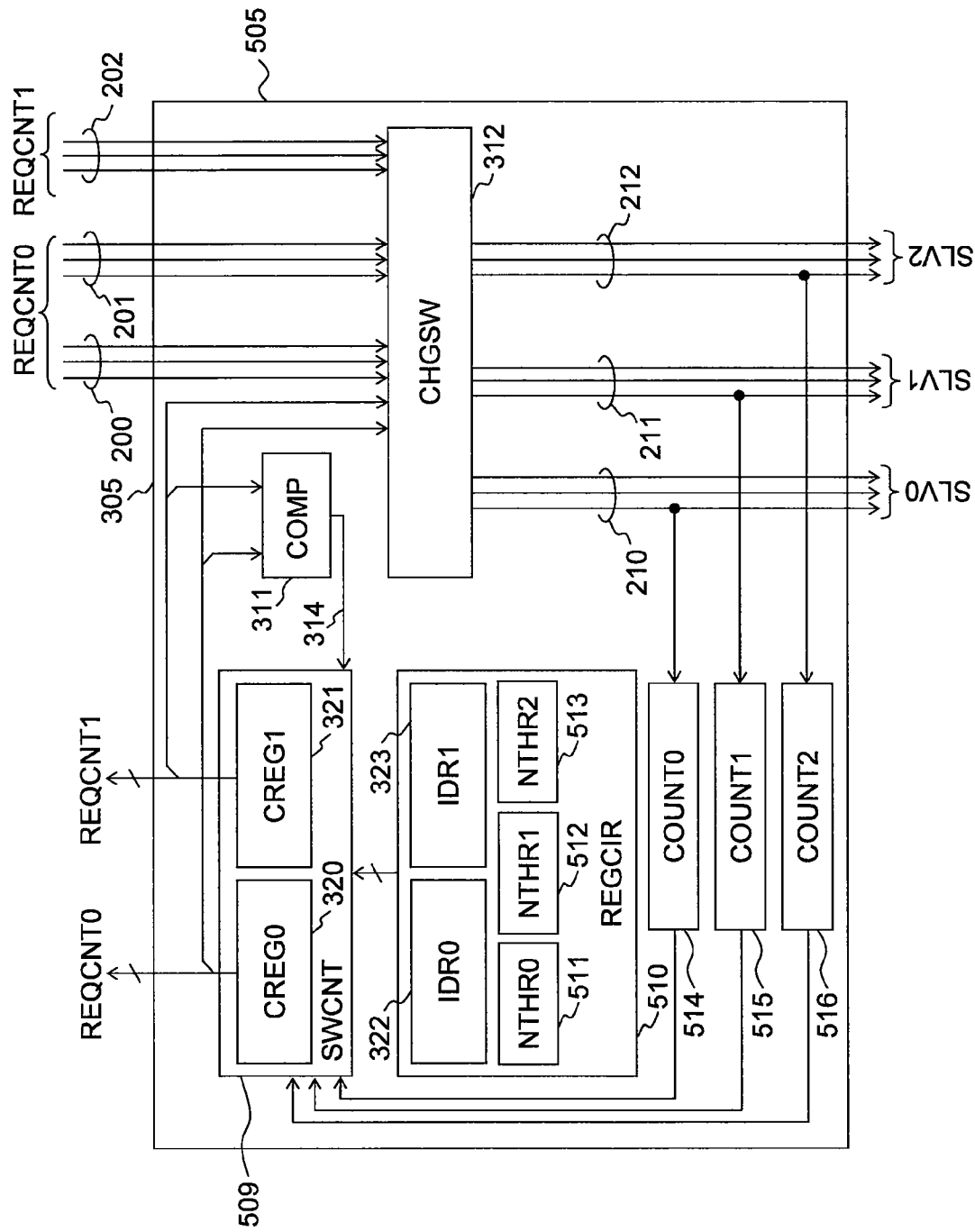
FIG. 10 is a block diagram showing the third example of the request-transaction circuit.
Figure 11:
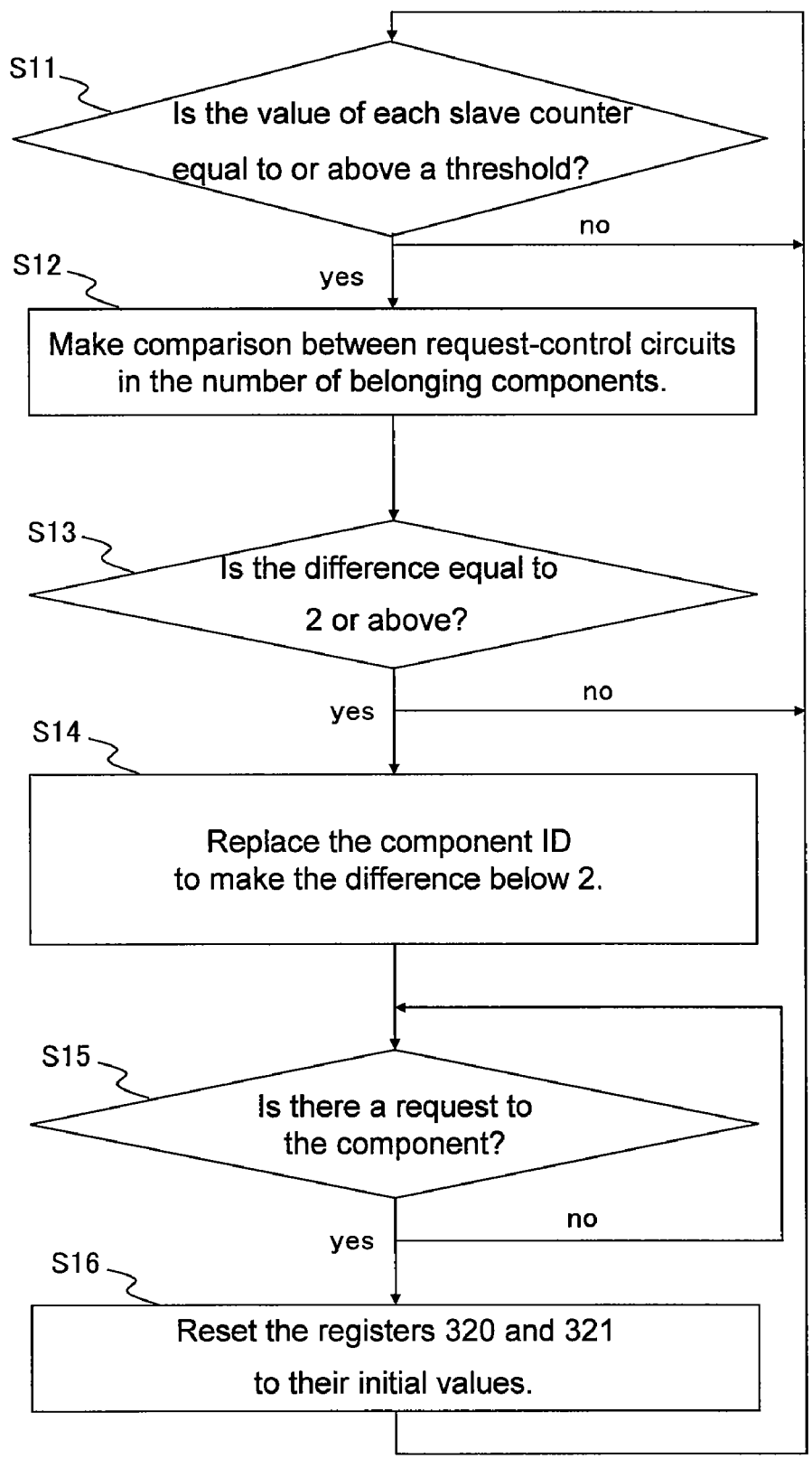
FIG. 11 is a flow chart showing an example of the flow of the action of changing the value of each control register in the third example.

Referring to FIG. 10, the third example of the slave-component-allocation-control circuit is shown. According to the arrangement of FIG. 4, the belonging component IDs associated with the request-control circuits 304a and 304b are rewritten in response to the direction of stopping a clock by the clock stop signal 110, whereby control is exercised. In contrast, according to the arrangement of FIG. 10, in case that a period during which no transfer request is accepted continues for a predetermined length of time for each slave component, the belonging component IDs associated with the request-control circuits 304a and 304b are rewritten in response to this, whereby control is performed. In this respect, the arrangement of FIG. 10 is different from the arrangement of FIG. 4. Now, the difference will be described here in detail. Counters (COUNT0-COUNT2) 514-516 count a period during which there is no transfer request for each of the slave components 103a, 103b and 103c. In other words, the counters count from an initial value each time select enable signals of the slave components included in the signals 210-212 are turned to their enable level. The counted values are passed to a switch-control circuit 509. The switch-control circuit 509 has threshold registers (NTHR0-NTHR2) 511-513 corresponding to the counted values. When detecting that the counted values input thereto reach values held by the corresponding threshold registers, the switch-control circuit 509 starts the same control as conducted when clock stop is directed by the clock stop signal 110 in the example of FIG. 4. The control flow is exemplified in FIG. 11. According to FIG. 11, when it is detected that the input counted values reach values held by the threshold registers (S11), the comparator circuit 311 performs a comparing action (S12). In case that it is detected, as a result of the comparison, the difference in the number of belonging components between the request-control circuits 304a and 304b is not less than two (S13), the register circuit 310 replaces the component IDs in the registers 320 and 321 to make the difference below two (S14) For example, supposing the state of FIG. 1 as the initial state (without the clock stop signal 110), the control register 320 has the component IDs of the slave components SLV0 and SLV1, the register 321 has the component ID of the slave component SLV2. When detecting that the input counted values reach the values of the corresponding threshold registers, the switch-control circuit 509 clears the component ID of the slave component SLV2 held by the control register 321. In this condition, the comparator circuit 311 compares the values of the control registers 320 and 321, and sends the result of the comparison in a form of signal 314 to the switch-control circuit 509. On receipt of the signal, the switch-control circuit 509 rewrites the component ID of the slave component SLV0 into the control register 320, and the component ID of the slave component SLV1 into the control register 321 in the process of Step S14. Thus, the state as shown in FIG. 2 (without the clock stop signal 110) is achieved. After that, a request signal is supplied to the slave component (SLV2) 103c. The switch-control circuit 509 detects it by an enable signal of the corresponding slave component (S15). Then, the switch-control circuit 509 transfers the initial values of the control registers 322 and 323 to the control registers 320 and 321 internally, and then the mode of control by the control circuit 505 is reset to its initial state.

Thus, the frequencies of using the request-control circuits can be leveled relatively with ease focusing attention on a condition that there is no transfer request directed at the slave component.

<<Example of Response-Transaction Circuit>>

Figure 12:
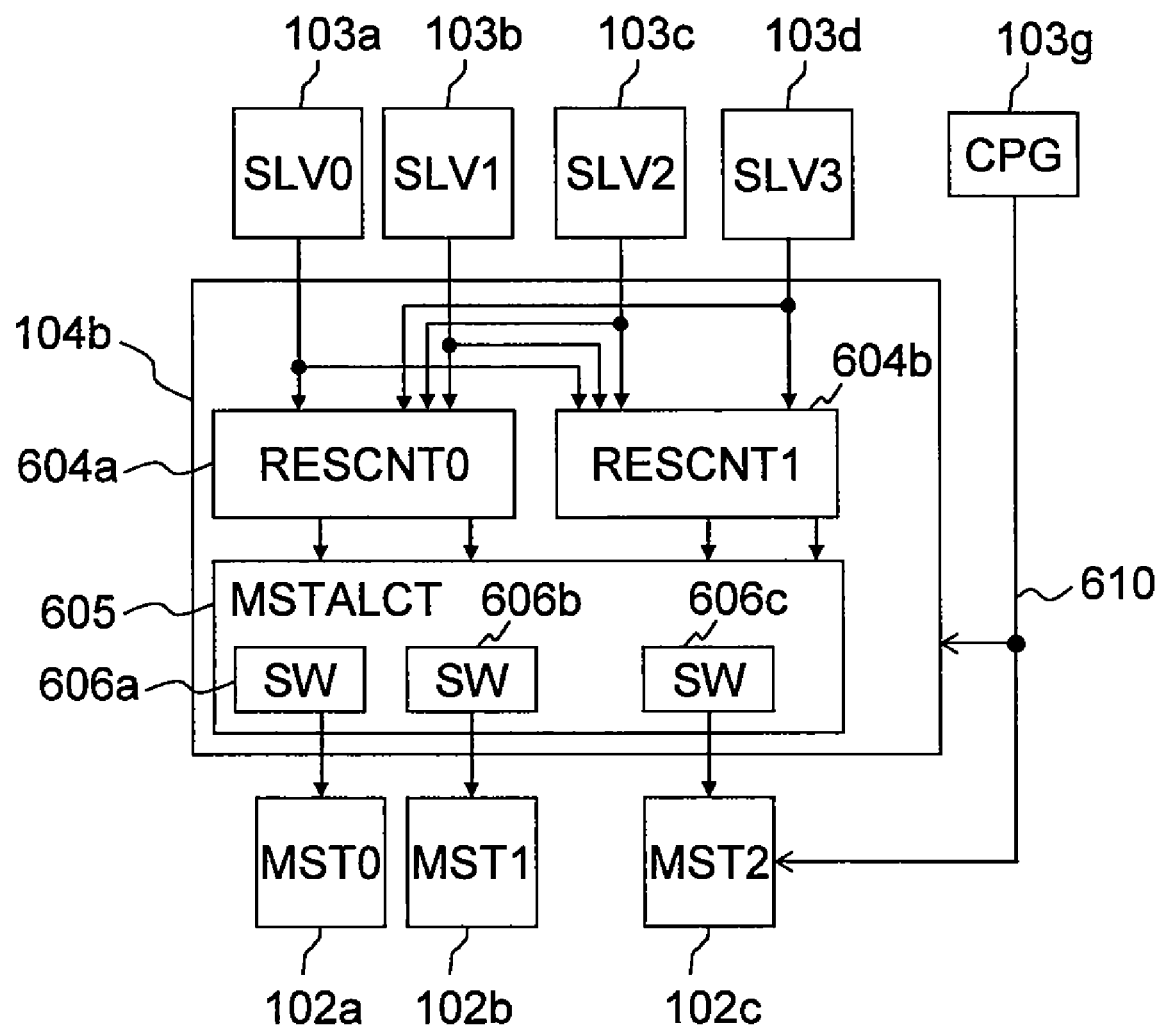
FIG. 12 is a block diagram showing an example of the response-transaction circuit.

Referring to FIG. 12, an example of the response-transaction circuit 104b is shown. In the drawing, three master components (MST0-MST2) 102a-102c and four slave components (SLV0-SVL3) 103a-103d are shown representatively for the sake of simplicity. The slave transaction circuit 104b has response-control circuits (RESCNT0, RESCNT1) 604a and 604b, and a master-component-allocation-control circuit (MSTALCT) 605. The response-control circuits (RESCNT0, RESCNT1) 604a and 604b judge the master component to transfer a reply from each slave component to according to address decoding, and arbitrate the conflict between replies to one master component according to the chronological or reverse chronological order of appearance of the replies, a predetermined order of priorities, or the like. The master-component-allocation-control circuit (MSTALCT) 605 variably decides the master components which the results of control by the response-control circuits 604a and 604b can be passed to, provided that the decision is made for each response-control circuit. The switch (SW) 606a, which is shown conceptually, is a circuit for selecting one of the master components 102a-102c, which will make a destination of supply of a reply output by the response-control circuit 604. Other switches (SW) 606b and 606c work likewise. In the drawing, the routes leading to the master components drawn just below the switches are shown as routes from the switches 606a-606c representatively.

Figure 13:
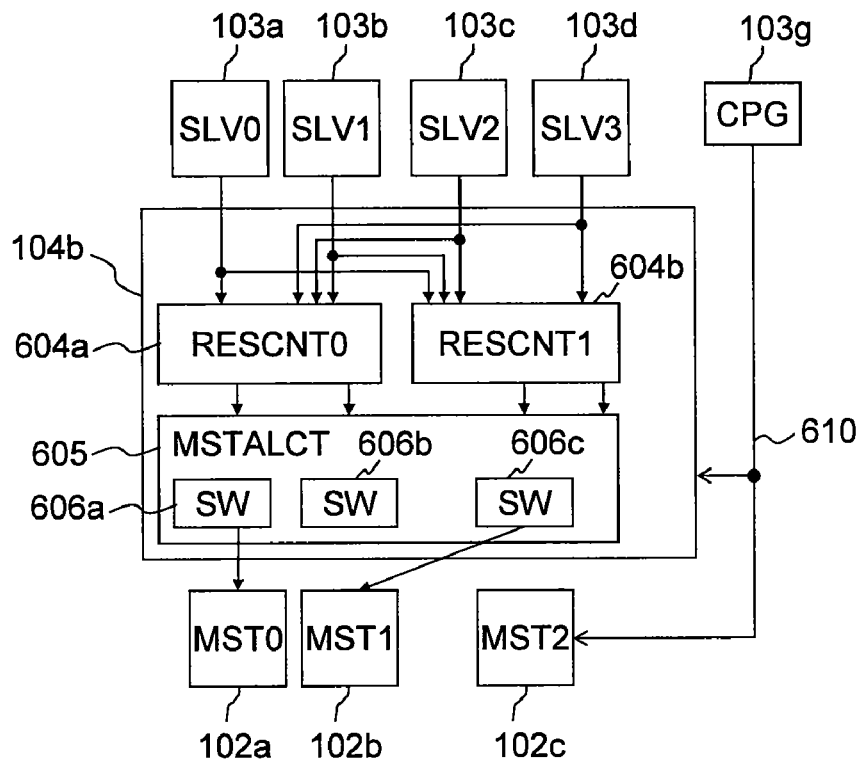
FIG. 13 is a block diagram showing a situation of the slave-transaction circuit when the action of part of master components is stopped in FIG. 12.

In the drawing is shown a situation that the master-component-allocation-control circuit 605 puts the response-control circuit 604a in charge of judgment and arbitration on requests for transfer to the master components 102a and 102b, and the response-control circuit 604b in charge of judgment and arbitration on requests for transfer to the master component 102c. Hence, the master-component-allocation-control circuit 605 provides a reply from the response-control circuit 604a for the master component 102a or 102b, and a reply from the response-control circuit 604b for the master component 102c. During such actions, the response-control circuit 604b is not used as an effective resource for the judgment and arbitration on the condition that a clock stop signal 610 from the clock pulse generator 103g brings the action of the master component 102c to a halt. FIG. 13 shows an example of the situation when such condition is canceled. Specifically, when the action of the master component 102c is stopped by a clock stop signal or the like, the master-component-allocation-control circuit 605 puts the response-control circuit 604a in charge of judgment and arbitration on requests for transfer to the master component 102a, and the response-control circuit 604b in charge of judgment and arbitration on requests for transfer to the master component 102b. Therefore, the master-component-allocation-control circuit 605 provides a reply from the response-control circuit 604a for the master component 102a, and a reply from the response-control circuit 604b for the master component 102b. Consequently, the response-control circuits 604a and 604b are both used as resources for the judgment and arbitration as described above, and the load on the response-control circuit 604a in control is lightened in comparison to the case that only the response-control circuit 604a performs judgment and arbitration for the master components 102a and 102b, whereby the access throughput with respect to master components, and therefore the throughput of data processing by each master component are increased. In short, the throughput of the router can be increased by dynamically switching resources so that an unoccupied resource can be utilized. As described with reference to FIGS. 1 and 2, the response-transaction circuit also can help to materialize a control mode such that while the slave component 103c is out of use, the request-control circuit 304a is dedicated to control of the slave component (SLV0) 103a by lightening the load on the request-control circuit 304a in control, whereby particularly the efficiency of the action of access through the slave component (SLV0) 103a is increased.

This is not shown in the drawing particularly, however it is needless to say that the second and third examples described concerning the request-transaction circuit are also applicable to the response-transaction circuit.

While the invention made by the inventor has been specifically described above based on the embodiments, it is not limited so. It is also needless to say that various changes and modifications may be made without departing from the subject matter hereof.

What is claimed is:

1. A semiconductor device comprising:
a plurality of master components capable of making a request for transfer;
a plurality of slave components capable of making a reply to the request for transfer; and
a router which relays the request for transfer and reply between the master and slave components,
wherein the router has a plurality of request-control circuits each initially being allocated a dedicated subset of the slave components, each request-control circuit judging the slave component to transfer a request from each master component to, and arbitrating conflict between requests to one slave component, and
a slave-component-allocation-control circuit variably deciding a dedicated subset of the slave components which a result of control by the request-control circuit can be passed to for each request-control circuit.

2. The semiconductor device according to claim 1, wherein the slave-component-allocation-control circuit has a set of first control registers to set in identification information of the slave components which the results of control by the respective request-control circuits can be passed to, and changes the identification information of the slave components in response of occurrence of a predetermined event.

3. The semiconductor device according to claim 2, wherein the slave-component-allocation-control circuit has a set of initial-value-data registers to set in initial values of the identification information of the slave components, and transfers initial values of the initial-value-data registers to the first control registers in response to disappearance of the predetermined event.

4. The semiconductor device according to claim 3, wherein the first control registers and initial-value-data registers are, initialized in response to system reset.

5. The semiconductor device according to claim 1, wherein the slave-component-allocation-control circuit has: a set of first data registers for storing first data used to determine the identification information of the slave component which a result of control by each request-control circuit can be passed to; and a set of second data register for storing second data utilized instead of the first data in response of occurrence of a predetermined event.

6. The semiconductor device according to claim 5, wherein the slave-component-allocation-control circuit utilizes the first data instead of the second data in response to disappearance of a predetermined event.

7. The semiconductor device according to claim 5, wherein the slave-component-allocation-control circuit has a second control register for directing whether or not to change the identification information for each slave module on occurrence of the predetermined event.

8. The semiconductor device according to claim 1, wherein when one of the slave components in the dedicated subset of slave components allocated to a request-control circuit is in a predetermined state, the slave-component-allocation-control circuit adjusts control values in order to allocate another slave component to the request control-circuit corresponding to the slave component in the predetermined state.

9. A semiconductor device comprising:
a plurality of master components capable of making a request for transfer;
a plurality of slave components capable of making a reply to the request for transfer; and
a router which relays the request for transfer and reply between the master and slave components,
wherein the router has a plurality of request-control circuits each judging the slave component to transfer a request from each master component to, and arbitrating conflict between requests to one slave component, and
a slave-component-allocation-control circuit variably deciding the slave component which a result of control by the request-control circuit can be passed to for each request-control circuit,
wherein the slave-component-allocation-control circuit has a set of first control registers to set in identification information of the slave components which the results of control by the respective request-control circuits can be passed to, and changes the identification information of the slave components in response of occurrence of a predetermined event, and
wherein on appearance of the slave component halted in action, the slave-component-allocation-control circuit changes the identification information of the slave components in the first registers so that a difference between the request-control circuits in number of the slave components in action, which results of control by the request-control circuits can be passed to, falls in a predetermined range on condition that the difference is beyond the predetermined range.

10. The semiconductor device according to claim 9, wherein the slave component halted in action is created by stopping supply of a synchronous clock signal thereto.

11. A semiconductor device comprising:
- a plurality of master components capable of making a request for transfer;
- a plurality of slave components capable of making a reply to the request for transfer; and
- a router which relays the request for transfer and reply between the master and slave components,
- wherein the router has a plurality of request-control circuits each judging the slave component to transfer a request from each master component to, and arbitrating conflict between requests to one slave component, and
- a slave-component-allocation-control circuit variably deciding the slave component which a result of control by the request-control circuit can be passed to for each request-control circuit,
- wherein the slave-component-allocation-control circuit has a set of first control registers to set in identification information of the slave components which the results of control by the respective request-control circuits can be passed to, and changes the identification information of the slave components in response of occurrence of a predetermined event, and
- wherein in case that a period during which no transfer request is accepted continues for a predetermined length of time for each slave component, the slave-component-allocation-control circuit brings the slave component to a halt, and
- the slave-component-allocation-control circuit changes the identification information of the slave components in the first control registers so that a difference between the request-control circuits in number of the slave components in action, which results of control by the request-control circuits can be passed to, falls in a predetermined range on condition that the difference is beyond the predetermined range.

12. The semiconductor device according to claim 11, wherein the slave-component-allocation-control circuit has a set of third control registers for defining the predetermined length of time.

13. A semiconductor device comprising:
- a plurality of master components capable of making a request for transfer;
- a plurality of slave components capable of making a reply to the request for transfer; and
- a router which relays the request for transfer and reply between the master and slave components,
- wherein the router has a plurality of response-control circuits each initially being allocated a dedicated subset of the master components, each response-control circuit judging the master component to transfer a reply from each slave component to, and arbitrating conflict between replies to one master component, and
- a master-component-allocation-control circuit variably deciding a dedicated subset of the master components which a result of control by the response-control circuit can be passed to for each response-control circuit.

14. The semiconductor device according to claim 13, wherein when one of the master components in the dedicated subset of master components allocated to a response-control circuit is in a predetermined state, the master-component-allocation-control circuit adjusts control values in order to allocate another master component to the response-control-circuit corresponding to the master component in the predetermined state.

15. A semiconductor device comprising:
- a plurality of master components capable of making a request for transfer;
- a plurality of slave components capable of making a reply to the request for transfer; and
- a router which relays the request for transfer and reply between the master and slave components,
- wherein the router has a plurality of request-control circuits each initially being allocated a dedicated subset of the slave components, each request-control circuit judging the slave component to transfer a request from each master component to, and arbitrating conflict between requests to one slave component,
- a slave-component-allocation-control circuit variably deciding the a dedicated subset of the slave components which a result of control by the request-control circuit can be passed to for each request-control circuit,
- a plurality of response-control circuits each initially being allocated a dedicated subset of the master components, each response-control circuit judging the master component to transfer a reply from each slave component to, and arbitrating conflict between replies to one master component, and
- a master-component-allocation-control circuit variably deciding a dedicated subset of the master components which a result of control by the response-control circuit can be passed to for each response-control circuit.

* * * * *